United States Patent [19]

Webber et al.

[11] Patent Number: 4,836,412
[45] Date of Patent: Jun. 6, 1989

[54] CONTINOUS LOOP FLEXIBLE LIP VACUUM SEAL

[75] Inventors: Jerry D. Webber, Moline; Jay H. Olson, Rock Island; Richard F. Gallens, Moline, all of Ill.

[73] Assignee: Deere & Company, Moline, Ill.

[21] Appl. No.: 894,079

[22] Filed: Aug. 5, 1986

Related U.S. Application Data

[63] Continuation of Ser. No. 788,518, Oct. 18, 1985, abandoned, which is a continuation of Ser. No. 734,253, May 14, 1985, abandoned, which is a continuation of Ser. No. 546,830, Oct. 31, 1983, abandoned.

[51] Int. Cl.$^4$ .......................... B65H 3/08; A01C 7/04; F16J 15/32; F16J 15/34
[52] U.S. Cl. .................................... 221/211; 277/81.5; 277/95; 277/199
[58] Field of Search ............... 221/211, 263, 266, 278; 165/9; 277/95, 81.5, 193, 199, 186, 184, 181, 212 R, 212 C, 212 F, 152

[56] References Cited

U.S. PATENT DOCUMENTS

| | | | |
|---|---|---|---|
| 3,447,781 | 6/1969 | Faukes | 277/184 X |
| 3,692,097 | 9/1972 | Penny | 165/9 |
| 3,999,690 | 12/1976 | Deckler | 221/211 X |
| 4,091,964 | 5/1978 | Harrer | 221/278 X |
| 4,105,062 | 8/1978 | Bell, III et al. | 277/81.5 X |
| 4,613,056 | 9/1986 | Olson | 221/211 |

FOREIGN PATENT DOCUMENTS 2543224 4/1976 Fed. Rep. of Germany ........ 277/95

Primary Examiner—Allan N. Shoap

[57] ABSTRACT

In a seed meter in which a vacuum source is coupled to the interior of a generally cylindrical housing in which a seed disk is rotatably mounted, a seal in the form of an endless loop is mounted within the housing so as to extend between an inner wall of the housing and a side surface of the seed disk so as to confine the vacuum from the vacuum source to a selected portion of the seed disk. The seal has a first portion of the length thereof extending around a major portion of a circle on the opposite side of a circumferential array of apertures in the seed disk from the axis of rotation of the seed disk and a second portion of the length thereof extending across the circumferential array of apertures and into a region adjacent the axis of rotation to isolate a seed discharge chamber on the other side of the seed disk from the vacuum source. The seal has a base portion extending along the length thereof and releasably mounted within a holder mounted on the inner wall of the housing, the base portion having ribs in the opposite sides thereof which fit into mating grooves in the side walls of the holder. The seal also has a thin lip portion along the length thereof which emanates from an edge of the base portion opposite the inner wall of the housing and which extends in a direction outwardly and away from the axis of rotation of the disk and into contact with the side surface of the disk.

20 Claims, 4 Drawing Sheets

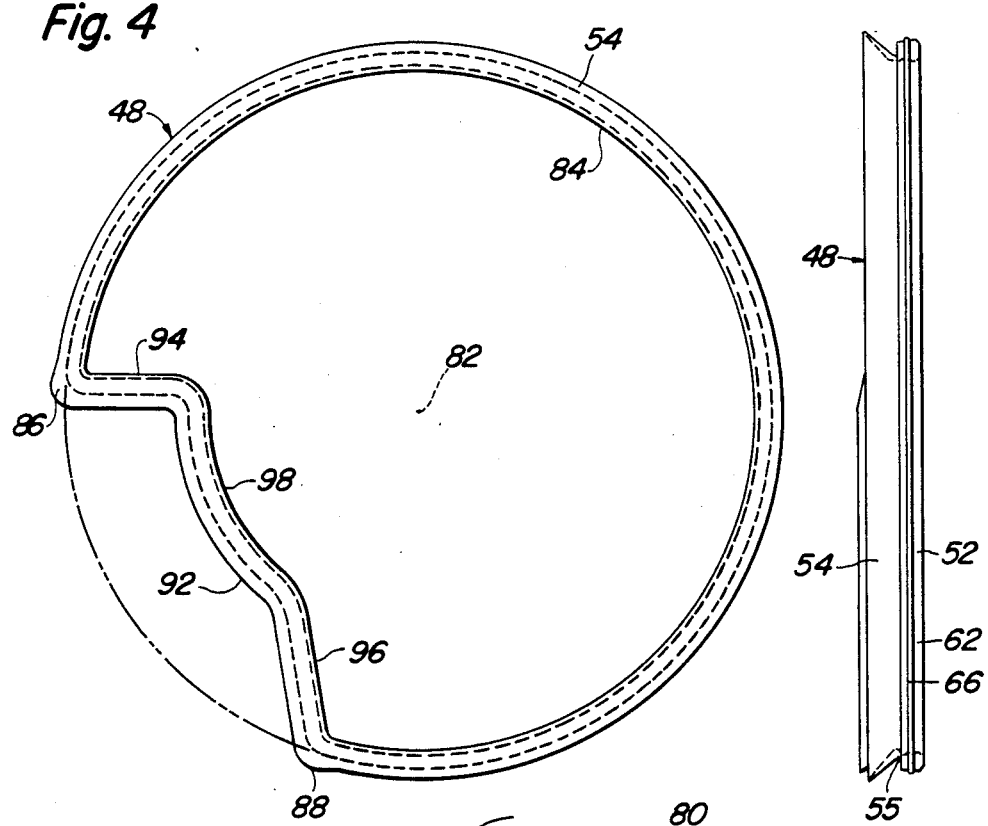
Fig. 4
Fig. 5
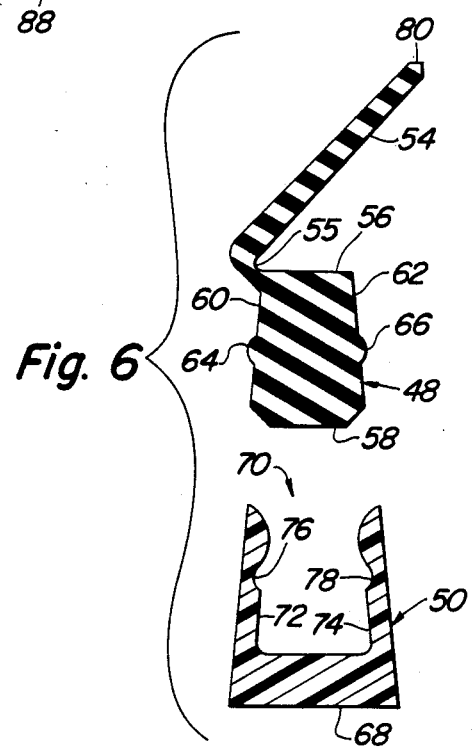
Fig. 6

1

CONTINOUS LOOP FLEXIBLE LIP VACUUM SEAL

This application is a continuation of application Ser. No. 788,518 filed Oct. 18, 1985, now abandoned, which is a continuation of application Ser. No. 734,253 filed May 14, 1985, now abandoned, which is a continuation of application Ser. No. 546,830 filed Oct. 31, 1983, now abandoned.

BACKGROUND OF THE INVENTION

1. Field of the Invention

The present invention relates to flexible seals, and more particularly to a flexible seal for sealing off a vacuum chamber at the side of a rotatable seed disk within the housing of a vacuum seed meter.

2. History of the Prior Art

It is known in the field of agricultural implements to provide a seed meter which meters or dispenses individual seeds from a seed mass during a planting operation. In seed meters of the air type as opposed to mechanical seed meters, blowing air or vacuum is used to hold individual seeds on a moving member such as a seed disk for eventual discharge. Examples of air seed meters using blowing air or pressure are provided by U.S. Pat. Nos. 3,888,387 of Deckler, 4,047,638 of Harrer and 4,074,830 of Adams. Examples of seed meters in which vacuum is used to hold individual seeds in place on the moving member are provided by U.S. Pat. Nos. 3,608,787 of Grataloup and 3,990,606 of Gugenhan. Such patents describe a variety of different arrangements using different configurations of a movable member for picking up, holding and then discharging the seeds. Such arrangements therefore provide a variety of different configurations and apparatus for communicating the blowing air or pressure or the vacuum, depending upon the type of air seed meter, to the moving member.

A different type of vacuum seed meter is described in a co-pending application of Lundie et al, Ser. No. 546,834, filed Oct. 31, 1983 (continuing application Ser. No. 883,851 filed July 10. 1986) with the present application. The vacuum seed meter described in the Lundie et al application disposes a rotatable seed disk within the hollow interior of a generally cylindrical housing which is mounted at the bottom of a seed hopper. Seeds from the hopper flow into a seed chamber within the housing on a side of the seed disk having a plurality of seed cells therein. As the seed disk rotates, the seed cells which are arranged in a circumferential array about the seed disk agitate, accelerate and then capture individual seeds therein. As the seed cells rise above the seed mass within the seed chamber, the individual seeds are held within the cells by vacuum from a source coupled to a vacuum chamber on the opposite side of the seed disk. The vacuum communicates with apertures at the bottoms of the seed cells which extend through the thickness of the seed disk. As the individual seeds are carried by the seed cells in the seed disk, they eventually reach a point where they must be released from the seed cells for discharge from the seed meter. This is accomplished by isolating the effects 20 of the vacuum from the seed cells in such a region.

In vacuum seed meters of the type described in the co-pending application of Lundie et al, it is necessary that the vacuum chamber within the seed meter housing be sealed so that the vacuum can be confined to the apertures within the seed disk which communicate with the seed cells. This requires sealing of the region between the outer periphery of the seed disk and the interior wall of the seed meter housing defining the vacuum chamber. Complicating this requirement is the fact that the seed meter rotates at a speed which can become quite substantial. An even further requirement is imposed by the necessity for cutting off the vacuum from that portion of the seed meter which is within the seed discharge area. These various requirements suggest the use of a seal between the inner wall of the seed meter housing and the seed disk in the region of the vacuum chamber so as to confine the vacuum to the apertures within the seed disk. At the same time, such seal must be capable of accommodating rotation of the seed disk, and must furthermore be capable of isolating a portion of the seed disk from the vacuum source.

It is known to provide flexible seals for use between a stationary member and a rotatable or otherwise movable member. Such seals are typically annular or circular in configuration and employ one or more relatively thin, flexible portions of a resilient sealing member or arrangement for bearing against the rotating or otherwise movable part. Examples of this type of seal are provided by U.S. Pat. Nos. 4,260,165 of Hartelius, 3,664,675 of Malmstrom, 3,713,659 of Derman, 3,703,296 of Malmstrom, 3,980,309 of Dechavaune, 3,504,917 of Malmstrom, 4,311,315 of Kronenberg add a product brochure on "V-RING" seals by Forsheda of Basle, Switzerland. Examples of other seals used in different sealing arrangements are provided by U.S. Pat. Nos. 4,375,292 of Ericson and 4,204,948 of Wechsler et al. While the various sealing arrangements noted in the patents and the article confront the problem of providing a seal between a moving part and a stationary part, and some address the situation in which a pressure differential is present or utilized in a sealing environment, none contemplate the particular problems discussed above in connection with a vacuum seed meter of the type shown in the previously referred to co-pending application of Lundie et al or suggest a solution thereto.

Accordingly, it would be desirable to provide an improved flexible seal for use between a stationary member and a rotatable or otherwise movable member. In particular, it would be advantageous to provide an improved seal for use with a vacuum seed meter in which a sealing relationship is maintained between the housing and a rotating seed disk and in which a portion of the seed disk is isolated from the vacuum source.

Brief Description of the Invention

Briefly, the present invention provides a seal for use in conjunction with a rotating seed disk or other moving part in which the seal extends from the inner wall of a housing into contact with the seed disk in a manner permitting rotation of the seed disk while maintaining an effective seal of the vacuum chamber which the seal surrounds. The seal is configured so as to isolate a portion of the seed disk from the vacuum source so that seeds held to the opposite side of the disk by the vacuum can be discharged in a selected area.

In a preferred embodiment of a seal in accordance with the invention for use in conjunction with a vacuum seed meter, a seal in the form of an endless loop of resilient material is disposed between the inner housing wall of the seed meter and a side surface of the seed disk. The seal has a base portion extending along the length thereof which is releasably held within a seal holder mounted on the inner wall of the housing. The seal also has a thin lip portion extending along the length thereof and emanating from a top edge of the base portion along the length of the seal. The lip portion extends from the base portion into contact with the side surface of the seed disk.

The base portion of the seal is preferably slightly tapered in cross-section so that the width thereof between opposite side surfaces adjacent the top of the base portion is slightly less than the width between the opposite side surfaces adjacent the bottom of the base portion. Each of the side surfaces has a rib extending therealong for receipt within a mating groove in one of the opposite side surfaces of a channel formed within the seal holder and extending along the length thereof. The seal holder is preferably made of resilient material so that the opposite side surfaces of the channel may be flexed apart to facilitate installation of the seal therein or removal of the seal therefrom and to form a vacuum sealing relationship with the base portion of the resilient seal.

The thin lip portion of the seal extends in a direction away from the axis of rotation of the seed disk as it extends from the base portion of the seal to the disk. Consequently the vacuum exerts an inward force on the lip portion of the seal so as to maintain the lip portion in contact with the seed disk as the seed disk rotates. The lip portion has a portion thereof of reduced thickness adjacent the base portion forming a hinge to facilitate flexing of the lip portion relative to the base portion.

A first portion of the length of the seal lies along the major portion of a circle having its center at the axis of rotation of the seed disk with the first portion being on the opposite side of a circumferential array of apertures through the seed disk from the axis of rotation. Consequently vacuum within the vacuum chamber freely communicates with the apertures in the region along the length of the first portion. A second portion of the length of the seal which extends between the opposite ends of the first portion extends inwardly toward the axis of rotation from the circle along which the first portion lies so as to isolate a portion of the side surface of the seed disk from the vacuum chamber and the vacuum therein. The second portion is comprised of two different relatively straight portions which extend across the circumferential array of apertures and an intermediate portion which curves in the same direction as the first portion of the seal.

Brief Description of the Drawings

The foregoing and other objects, features and advantages of the invention will be apparent from the following more particular description of a preferred embodiment of the invention, as illustrated in the accompanying drawings, in which:

FIG. 4 is a plan view of the flexible vacuum seal;

FIG. 5 is a side view of the flexible vacuum seal; and

FIG. 6 is a sectional view of the flexible vacuum seal in conjunction with the holder therefor.

Detailed Description

Figure 1:
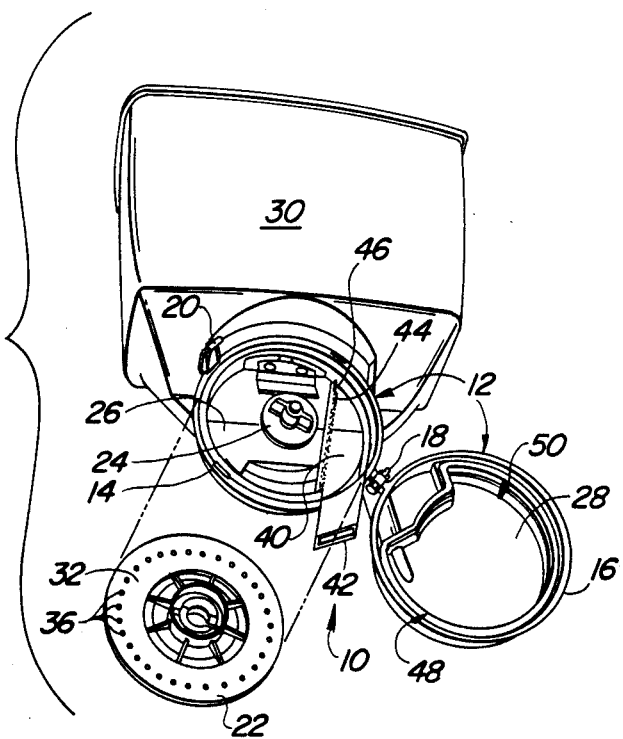
FIG. 1 is a perspective view of a vacuum seed meter in an open position and showing a seed disk in conjunction with a flexible vacuum seal in accordance with the invention.
Figure 2:
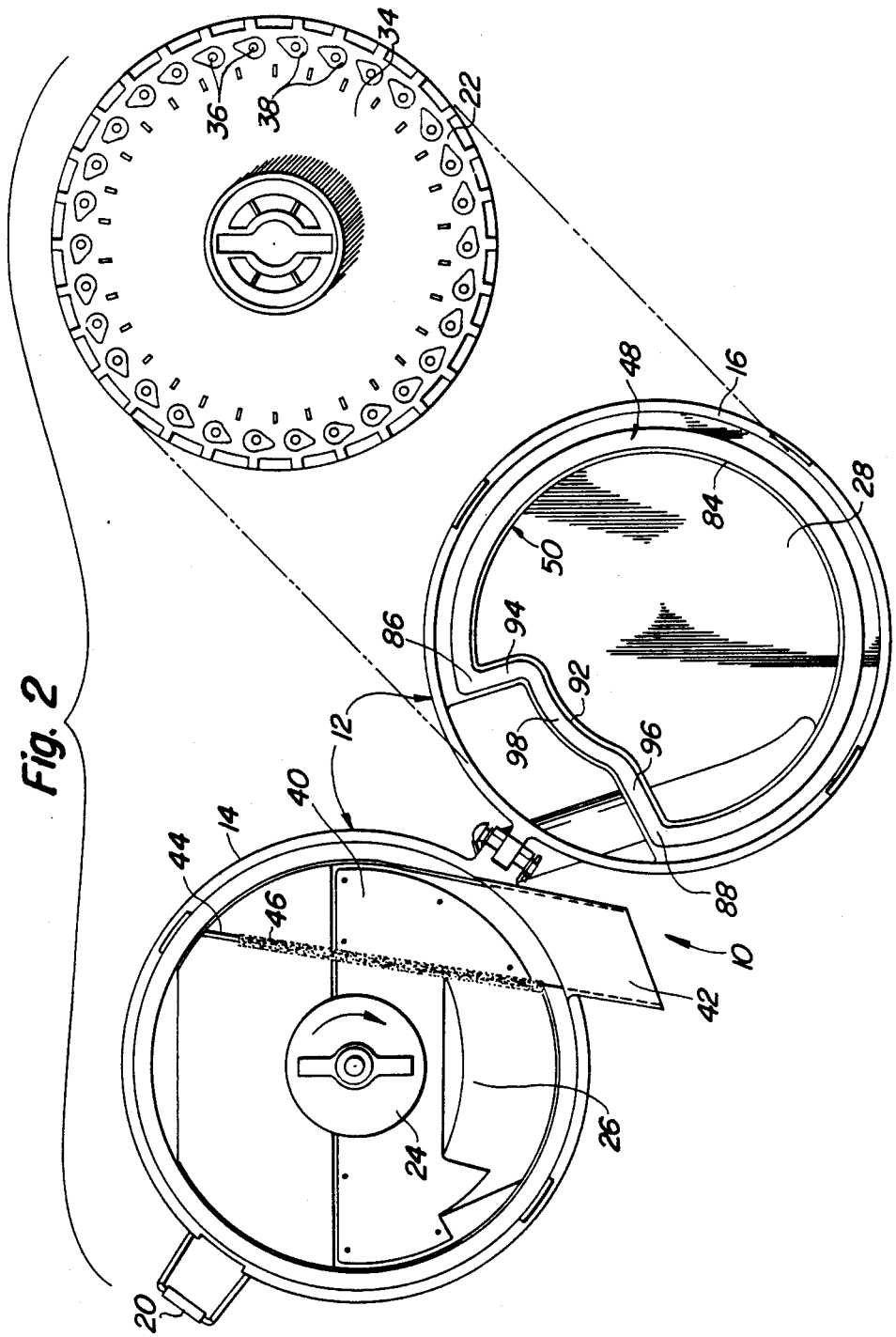
FIG. 2 is a front view of the vacuum seed meter of FIG. 1 and showing the reverse side of the seed disk.
Figure 3:
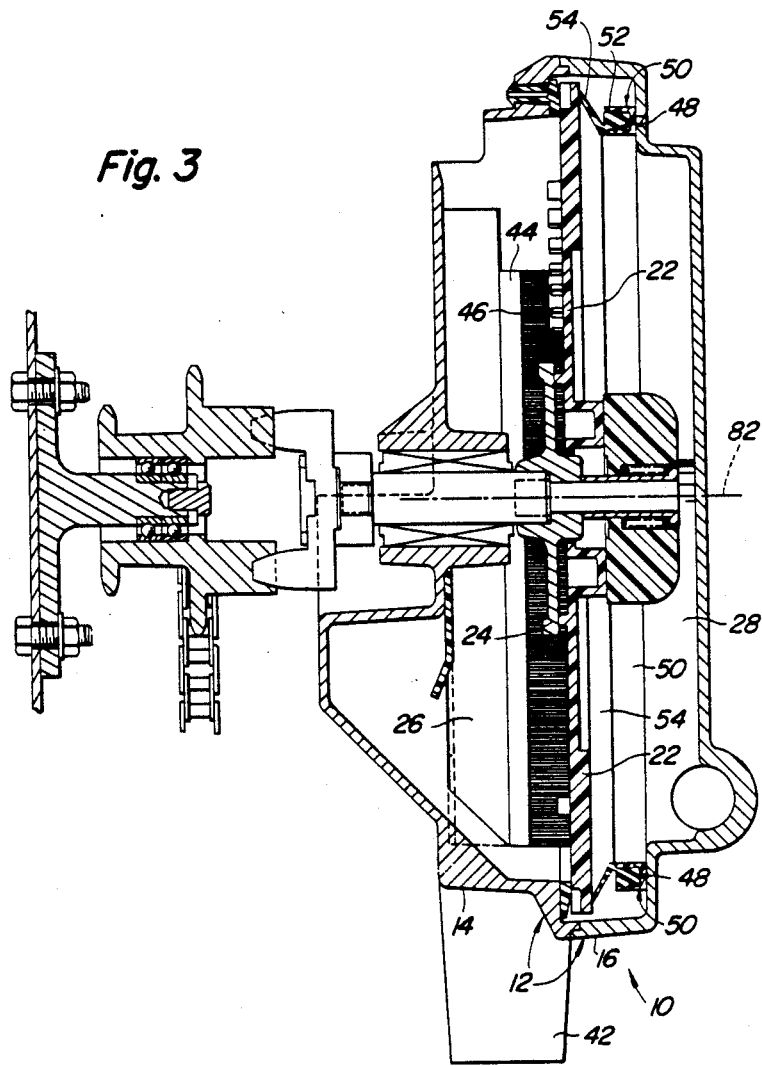
FIG. 3 is a sectional view of the vacuum seed meter of FIG. 1 showing the meter in the closed position with the seed disk rotatably mounted therein and the flexible vacuum seal in accordance with the invention disposed against the seed disk.

FIGS. 1-3 depict a vacuum seed meter 10 utilizing a flexible vacuum seal in accordance with the invention. The vacuum seed meter 10 has a generally cylindrical housing 12 comprised of a first half shell 14 and an opposite, mating second half shell 16. The second half shell 16 is coupled to the first half shell 14 by a hinge 18, enabling the second half shell 16 to be closed over the first half shell 14 and locked in such position with a clasp 20 to close the generally cylindrical housing 12.

The vacuum seed meter 10 includes a seed disk 22 which is rotatably mounted on a hub 24 positioned at the center of the first half shell 14. With the seed disk 22 mounted on the hub 24 and the generally cylindrical housing 12 in the closed position, the seed disk 22 divides the interior of the housing 12 into a seed chamber 26 between the disk 22 and the first half shell 14 and a vacuum chamber 28 between the seed disk 22 and the second half shell 16. The generally cylindrical housing 12 is mounted at the bottom of the seed hopper 30 designed to contain a quantity of seed to be metered by the vacuum seed meter 10. Seeds within the seed hopper 30 flow into the seed chamber 26 within the first half shell 14 of the housing 12 where they form a seed mass against the side of the seed disk 22.

FIG. 1 depicts a first side surface 32 of the seed disk 22 which faces the second half shell 16 and forms a part of the vacuum chamber 28 when the housing 12 is closed. An opposite second side surface 34 of the seed disk 22 is shown in FIG. 2. The second side surface 34 faces the first half shell 14 and forms a part of the seed chamber 26 therein. As seen in FIG. 1 the seed disk 22 has a circumferential array of apertures therein in the form of a row of apertures 36 circumferentially disposed about the disk 22 adjacent the outer periphery thereof. As seen in FIG. 2 each of the apertures 36 extends through the thickness of the seed disk 22 so as to communicate between the first side surface 32 and the bottom of each of a plurality of seed cells 38 in the second side surface 34 of the seed disk 22.

It was previously noted that seeds from the seed hopper 30 flow into the seed chamber 26 within the first half shell 14 and form a seed mass at the second side surface 34 of the seed disk 22. The hub 24 is driven so as to rotate the seed disk 22. As the seed cells 38 on the second side surface 34 of the seed disk 22 move through the seed mass with rotation of the seed disk 22, the seed cells 38 agitate, accelerate and then capture therein individual seeds from the seed mass. As each such seed cell 38 begins to rise out of the seed mass, the individual seed contained therein is held in place by vacuum from a source which is coupled to the vacuum chamber 28 within the second half shell 16 and which communicates with the seed chamber 26 and the seed mass therein via the apertures 36. The vacuum holds the individual seeds within the seed cells 38 until the seed cells 38 reach a seed discharge area 40 at one side of the seed chamber 26. As the individual seed cells 38 enter the seed discharge area 40, the effects of the vacuum within the vacuum chamber 28 are cut off therefrom as explained hereafter, allowing the individual seed held within each seed cell 38 to fall out of the seed cell 38 under the influence of gravity. The seed then falls through a seed discharge chute 42 to the ground below.

The seed discharge area 40 is separated from the seed chamber 26 by a divider 44 which has a brush 46 mounted thereon and bearing against the second side surface 34 of the seed disk 22.

The construction and operation of the vacuum seed meter 10 are shown and described in greater detail in the previously referred to co-pending application of Lundie et al.

Referring to FIGS. 1-3 a flexible vacuum seal 48 in accordance with the invention is mounted within the second half shell 16. The seal 48 which is in the form of an endless loop is releaseably held within a holder 50 mounted on the inner wall of the second half shell 16. The seal 48 by itself is shown in FIGS. 4 and 5 and in sectional view together with the holder 50 in FIG. 6. The seal 48 is comprised of a base 52 extending along the length of the seal 48 and a thin lip 54 which extends along the length of the seal 48 and which is attached to the base 52 at a portion of the lip 54 of reduced thickness forming a resilient hinge 55. The base 52 has a top surface 56, an opposite bottom surface 58, an inner side surface 60 and an opposite outer side surface 62. The inner side surface 60 includes a rib 64 extending along the length of the inner side surface 60. In like fashion the outer side surface 62 has a rib 66 therein extending along the length thereof.

As seen in FIG. 6 the seal 48 is adapted to be releaseably held within the holder 50. The holder 50 which has a bottom surface 68 thereof mounted on the inner wall or surface of the second half shell 16 has a channel 70 therein along the length thereof. The channel 70 has opposite side walls 72 and 74 adapted to receive the inner and outer side surfaces 60 and 62 respectively of the base 52. The side wall 72 has a groove 76 therein along the length thereof for receiving the rib 64. In like fashion the side wall 74 has a groove 78 therein for receiving the rib 66 on the outer side surface 62 of the base 52.

The holder 50 is preferably comprised of resilient material such as plastic so that the opposite side walls 72 and 74 thereof can be flexed apart to facilitate installation of the seal 48 therein and removal of the seal 48 therefrom. The base 52 has a width thereof between the opposite side surfaces 60 and 62 at the top thereof adjacent the top surface 56 which is slightly less than the width between the side surfaces 60 and 62 adjacent the bottom surface 58. This requires that the side walls 72 and 74 of the holder 50 be spread apart slightly as the base 52 is inserted into the channel 70. Further downward movement of the base 52 into the channel 70 eventually results in seating of the base 52 therein with the ribs 64 and 66 snapping into place within the grooves 76 and 78 respectively. Removal of the seal 48 from he holder 50 is accomplished by exerting an upward force on the seal 48 or by spreading the side walls 72 and 74 of the holder 50 apart, or both. This unseats the ribs 64 and 66 from the grooves 76 and 78 and allows the base 52 to slide upwardly and out of the channel 70.

The resilient material of the holder 50 also combines with the resilient material of the base 52 to form a vacuum-tight seal therebetween. With the bottom surface 58 of the holder 50 secured to the inner wall at the second half shell 16 such as by an adhesive, a vacuum-tight seal is formed between the inner wall of the half shell 16 and the lip 54.

As perhaps best seen in FIG. 6 the thin lip 54 of the seal 48 emanates from the base 52 at an upper edge of the base 52 where the inner side wall 60 and the top surface 56 join together. The lip 54 which is flexibly coupled to the base 52 via the hinge 55 extends upwardly and outwardly from the base 52 and terminates in an edge 80 thereof which contacts the first side surface 32 of the seed disk 22. As seen in FIGS. 3 and 5 the lip 54 extends in a direction outwardly and away from an axis 82 about which the seed disk 22 rotates and about which the seal 48 is centered as the lip 54 extends from the base 52 to the first side surface 32 of the seed disk 22. This disposes the lip 54 at an angle of approximately 45° with the first side surface 32 of the seed disk 22. With a vacuum source coupled to the vacuum chamber 28 within the interior of the second half shell 16, the resulting low pressure within the confines of the seal 48 tends to draw the lip 54 inwardly. This results in the lip 54 being held against the first side surface 32 of the seed disk 22 by the reduced pressure. This feature tends to provide a relatively tight sealing relationship between the seal 48 and the seed disk 22 in the face of rotation of the seed disk 22. At the same time the flexible nature of the lip 54 of the seal 48 further enhances the sealing relationship as well as the ability of the seed disk 22 to rotate relatively freely. The lip 54 flexes a relatively small amount along the length thereof with most of the flexing occurring at the hinge 55. This allows the edge 80 to maintain a sealing fit against the seed disk 22 while at and the same time minimizing the surface area of the lip 54 and therefore the drag on the seed disk 22. Such flexibility and close sealing relationship tend to allow for manufacturing and assembly tolerances of the vacuum seed meter 10 and its seed disk 22.

As seen in FIG. 4 the seal 48 has a first portion 84 extending along the length of the seal 48 between a first end 86 thereof and an opposite second end 88 thereof. The first portion 84 extends around the major portion of a circle 90 illustrated in dotted outline in FIG. 4 and having its center on the axis 82. The first portion 84 of the seal 48 resides against the first side surface 32 of the seed disk 22 at a location on the opposite side of the circumferential array of apertures 36 from the axis 82. This allows the vacuum within the vacuum chamber 28 to communicate with those apertures 36 residing within the confines of the seal 48. Communication of the vacuum with the apertures 36 provides for the holding of the individual seeds within the seed cells 38 as the seed cells 38 rise out of the seed mass within the seed chamber 26 as previously described.

The seal 48 has a second portion 92 extending along the length thereof between the first and second ends 86 and 88 which extends inwardly from the circle 90 in a direction toward the axis 82. The second portion 92 is comprised of a relatively straight portion 94 which extends inwardly from the first end 86 across the circumferential array of apertures 36 and a second relatively straight portion 96 which extends across the circumferential array of apertures 36 from the second end 88. An intermediate portion 98 of the second portion 92 of the seal 48 extends between the straight portions 94 and 96 and is curved in the same general direction as the first portion 84 of the seal 48.

Therefore it will be seen that the shape of the second portion 92 of the seal 48 causes each of the apertures 36 to momentarily exit the vacuum chamber 28 as the seed disk 22 rotates. This momentary exiting of each aperture 36 occurs as the associated seed cell 38 on the second side surface 34 of the seed disk 22 enters the seed discharge area 40. Thus the vacuum is cut off from the aperture 36 and the associated seed cell 38 from the time the aperture 36 crosses the straight portion 94 until the aperture 36 crosses the straight portion 96. This allows an individual seed contained within the seed cell 36 to be released from the seed cell 38 within the seed discharge area 40 and to fall through the seed discharge chute 42. The straight portion 96 is disposed on the opposite side of the seed disk 22 from and generally coincident with a portion of the brush 46 at the boundary of the seed discharge area 40. This insures against the apertures 36 being open or free of seeds outside of the seed discharge area 40 which would cause unwanted vacuum loss. The straight portion 94 is preferably in a horizontal position when the seed meter 10 is in the operative position. This allows seeds released within the seed discharge area 40 to fall straight down. The curved intermediate portion 98 rides against a relatively smooth portion of the side 32 of the seed disk 22 inside of the circumferential array of the apertures 36.

As shown in FIGS. 4 and 5 the width of the lip 54 along the first portion 84 of the seal 48 is slightly less than along the second portion 92. This reduces the drag exerted on the seed disk 22 by the first portion 84 of the seal 48 without any significant reduction in the seal provided thereby.

It was previously noted that the lip 54 of the seal 48 extends in a direction outwardly and away from the axis 82 as it extends from the base 52 into contact with the first side surface 32 of the seed disk 22. FIGS. 4 and 5 make clear the manner in which this occurs. The vacuum is confined within the endless seal 48 and therefore tends to draw all portions of the lip 54 in an inward direction toward the axis 82. This results in the lip 54 being held tightly against the first side surface 32 of the seed disk 22 along the entire length of the seal 48. The portion of the lip 54 which extends along the first portion 84 of the seal 48 forms the major portion of a section of a cone having a central axis coinciding with the axis 82.

While the invention has been particularly shown and described with reference to a preferred embodiment thereof, it will be understood by those skilled in the art that various changes in form and details may be made therein without departing from the spirit and scope of the invention.

What is claimed is:

1. A seal of resilient material, the seal being generally continuous configuration and having a base portion extending along the length thereof, a hinge portion extending along the length thereof and a relatively thin lip portion extending along the length thereof, the relatively thin lip portion being joined to the base portion by the hinge portion along the length of the seal, the lip portion being substantially thinner than the base portion and the hinge portion being thinner than the lip portion, the base, hinge and lip portions being formed from a single, integral element of the same material, the seal having a first portion of the length thereof lying along substantially more than half the circumference of a circle between opposite first and second ends thereof and a second portion of the length thereof extending between the first and second ends and lying inside of the circle.

2. The invention set forth in claim 1, wherein the second portion of the length of the seal is comprised of a first relatively straight portion thereof extending inwardly from the circle at the first end, a second relatively straight portion thereof extending inwardly from the circle at the second end, and a curved portion thereof extending between the first and second relatively straight portions and curving in the same general direction as the circle.

3. The invention set forth in claim 1, wherein the relatively thin lip portion extends outwardly in a direction away from the center of the circle as it emanates from the base portion and terminates in an outer edge opposite the base portion.

4. The invention set forth in claim 3, wherein the part of the relatively thin lip portion extending along the first portion of the length of the seal defines part of a section of a cone having a central axis passing through the center of the circle.

5. The invention set forth in claim 3, wherein the base portion has a top surface thereof extending between inner and outer edges relative to the center of the circle and the hinge portion emanates from the inner edge of the base portion.

6. The invention set forth in claim 5, wherein the base portion has a bottom surface opposite the top surface, an inner side surface extending between the bottom surface and the inner edge of the top surface and an outer side surface extending between the bottom surface and the outer edge of the top surface, the distance between the inner and outer side surfaces adjacent the top surface being slightly less than the distance between the inner and outer side surfaces adjacent the bottom surface.

7. The invention set forth in claim 6, wherein the base portion has a first ridge on the inner side surface extending along the length of the seal intermediate the top and bottom surfaces and an opposite second ridge on the outer side surface extending along the length of the seal intermediate the top and bottom surfaces.

8. The invention set forth in claim 7, further including a mounting member extending along the length of the seal, the mounting member having a slot therein along the length thereof for releaseably securing the base portion of the seal therein, the slot having opposite side walls disposed in contact with the inner and outer side surfaces of the base portion of the seal, each of the opposite side walls having a groove therein for receiving the first and second ridges on the inner and outer side surfaces of the base portion of the seal.

9. The invention set forth in claim 8, wherein the mounting member is made of resilient material to permit the opposite side walls of the slot to be temporarily flexed outwardly to permit installation of the seal therein and removal of the seal therefrom.

10. In a seed meter, the combination comprising:
a seed disk mounted for rotation about an axis and having a side surface facing outwardly in the direction of the axis, the disk also having a plurality of apertures extending through the thickness of the disk from the side surface thereof;
a housing member disposed adjacent the seed disk and having an inside configured to form a compartment therein at the side surface of the seed disk, substantially the entire side surface of the seed disk forming a boundary of the compartment;
an elongated seal mounted on the inside of the housing member and having a lip portion along the length thereof which projects in the axial direction into contact with the side surface of the seed disk radially outwardly of the axis as the seed disk rotates relative to the seal, the seal forming a generally continuous loop extending around a substantial portion of the compartment and forming a vacuum chamber therein together with a portion of the side surface of the seed disk and a portion of the inside of the housing member; and means for creating a reduced pressure within the vacuum chamber of the housing member.

11. The invention set forth in claim 10, wherein substantially more than half of the length of the seal extends around the axis along the circumference of a circle to form a partially circular configuration and the lip portion of the seal extends generally outwardly and away from the axis as it extends from the seal to the side surface of the seed disk.

12. The invention set forth in claim 10, wherein the seed disk is rotatable about an axis, the plurality of apertures extending through the thickness of the seed disk are arranged in a circumferential array about the seed disk and the seal has a first portion of the length thereof disposed on the opposite side of the circumferential array of apertures from the axis and a second portion of the length thereof disposed on the same side of the circumferential array of apertures as the axis.

13. The invention set forth in claim 12, wherein the first portion of the length of the seal extends around a substantially more than half the circumference of a circle having its center at the axis and the second portion of the length of the seal extends inwardly from the circle toward the axis.

14. The invention set forth in claim 13, wherein the first portion of the length of the seal has a pair of opposite ends thereof and the second portion of the length of the seal has a pair of opposite end portions thereof extending across the circumferential array of apertures from the pair of opposite ends of the first portion of the length of the seal and an intermediate portion joining the pair of opposite end portions and disposed on the same side of the circumferential array of apertures as the axis.

15. The invention set forth in claim 13, wherein the lip portion extending along the first portion of the length of the seal lies within a major portion of a section of a cone having a central axis coincident with the axis about which the seed disk is rotatable.

16. In a vacuum seed meter, the combination comprising:

a generally cylindrical housing having a hollow interior defined by an inner wall thereof;

a seed disk mounted for rotation about an axis within the housing and having an axially facing side surface;

a seal in the form of a generally continuous loop mounted within the housing, the seal being mounted on the inner wall and having a lip portion along the length thereof which extends in the axial direction into contact with the side surface of the seed disk radially outwardly of the axis to define a vacuum chamber lying within the generally continuous loop and between the side surface of the seed disk and the inner wall, the seal encompassing a major portion of the side surface of the seed disk and having a radially inwardly directed indentation in the configuration thereof which forms a non-vacuum chamber outside of the seal at a minor portion of the side surface of the seed disk; and means for providing a reduced pressure within the vacuum chamber.

17. The invention set forth in claim 16, wherein the seed disk has a circumferential array of apertures therein, and the seal has a first portion of the length thereof disposed on an opposite side of the circumferential array of apertures from the axis and a second portion of the length thereof at the indentation in the configuration thereof disposed on the same side of the circumferential array of apertures as the axis.

18. The invention set forth in claim 16, wherein the seal has a base portion along the length thereof which is mounted on the inner wall of the housing and the lip portion emanates from the base portion at a region of the lip portion of reduced thickness forming a hinge for the lip portion and which extends into contact with the side surface of the seed disk.

19. The invention set forth in claim 18, wherein the lip portion extends gradually away from the axis as it extends from the base portion to the side surface of the seed disk.

20. The invention set forth in claim 18, further including a seal holder in the form of an endless loop, the seal holder being mounted on the inner wall of the housing and releaseably mounting the base portion of the seal therein.

* * * * *